United States Patent [19]

Mahr

[11] Patent Number: 5,691,519
[45] Date of Patent: Nov. 25, 1997

[54] ELECTRIC SWITCH, FOR USE ON AUTOMOTIVE STEERING COLUMN SWITCH

[75] Inventor: Hermann Mahr, Waldalgesheim, Germany

[73] Assignee: Eaton Corporation, Cleveland, Ohio

[21] Appl. No.: 525,794

[22] PCT Filed: Mar. 17, 1993

[86] PCT No.: PCT/DE94/00304

§ 371 Date: Mar. 11, 1996

§ 102(e) Date: Mar. 11, 1996

[87] PCT Pub. No.: WO94/21489

PCT Pub. Date: Sep. 29, 1994

[30] Foreign Application Priority Data

Mar. 25, 1993 [DE] Germany .......... 43 19 711.1

[51] Int. Cl.[6] .................................................. H01H 9/00
[52] U.S. Cl. .............................. 200/61.54; 200/61.27
[58] Field of Search ............. 200/4, 17 R, 61.27–61.38, 200/61.54

[56] References Cited

U.S. PATENT DOCUMENTS

| | | | |
|---|---|---|---|
| 3,940,579 | 2/1976 | Bühl et al. | 200/4 |
| 4,219,709 | 8/1980 | Scarbo | 200/61.54 |
| 4,810,839 | 3/1989 | Chretien | 200/4 |
| 4,942,273 | 7/1990 | Furuhashi et al. | 200/61.54 |
| 5,047,600 | 9/1991 | Enari et al. | 200/61.54 |
| 5,049,706 | 9/1991 | Du Rocher | 200/61.54 |
| 5,272,290 | 12/1993 | Suzuki et al. | 200/4 |

*Primary Examiner*—Michael L. Gellner
*Assistant Examiner*—Michael A. Friedhofer
*Attorney, Agent, or Firm*—Roger A. Johnston

[57] ABSTRACT

"A stalk switch for automotive steering column having the stalk lever pivoted about a vertically disposed cross-pin having its ends mounted with ball and socket connections to a slider. A push button in the end of the lever moves the lever and slider for effecting switching by one set of contacts and pivoting the lever about the axis of the cross pin effects switching of another set of contacts. Pivoting the lever about an axis transverse to the cross pin axis causes the cross pin ball ends to pivot in the sockets and moves another slider for effecting switching of a third set of contacts. A rotatable ring is mounted on the lever and is rotatable for effecting switching of a fourth set of contacts."

10 Claims, 4 Drawing Sheets

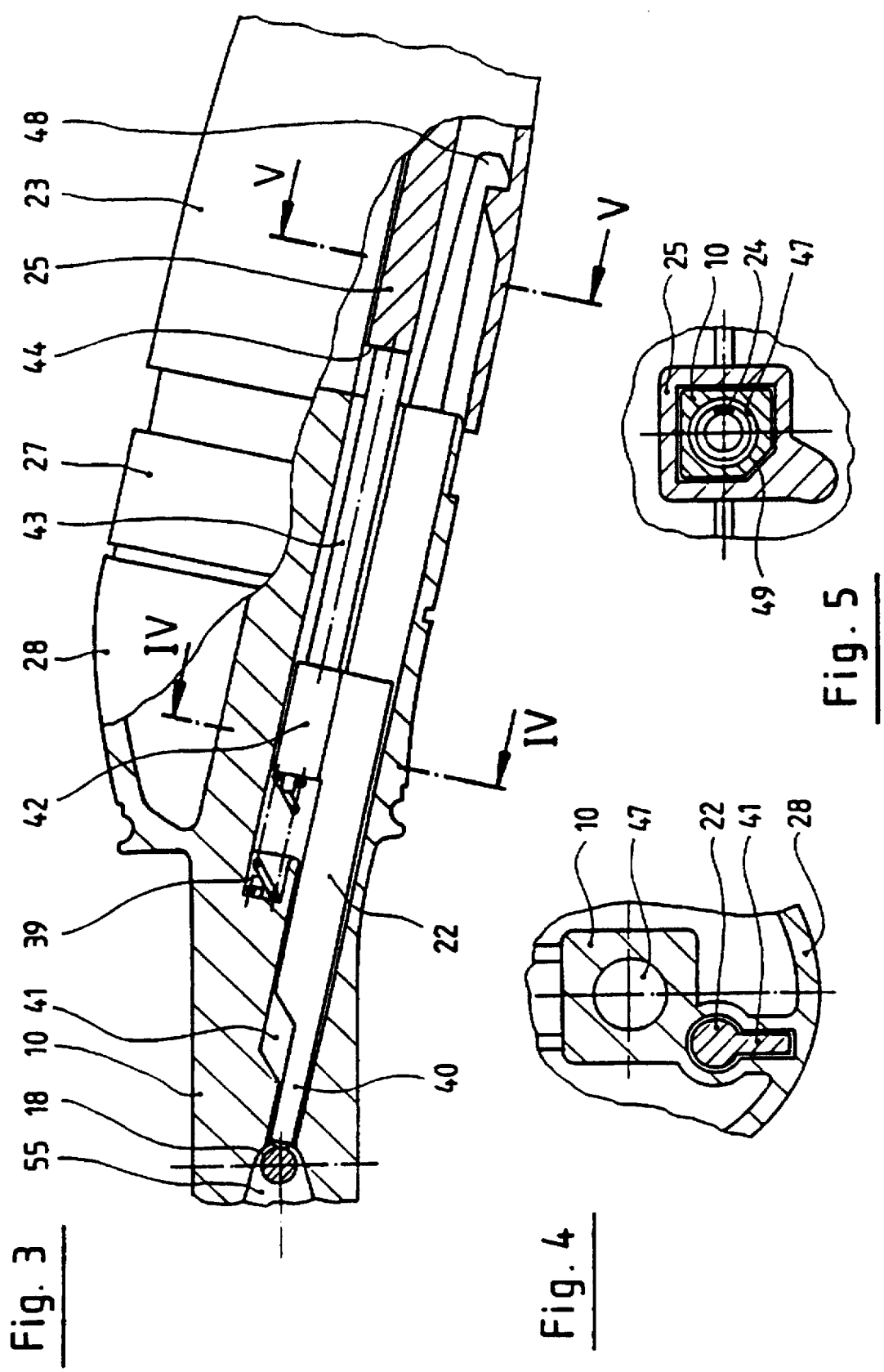

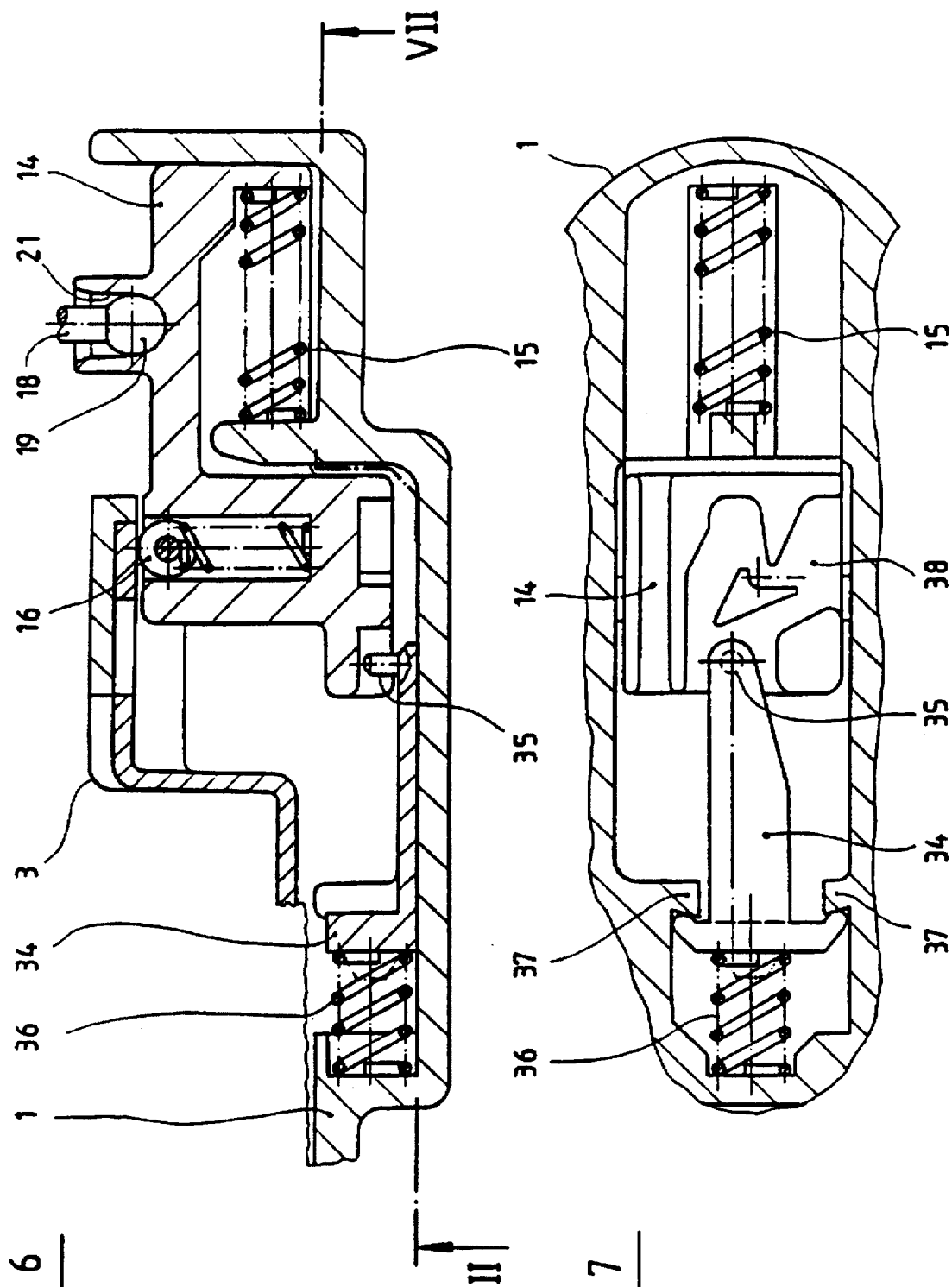

ELECTRIC SWITCH, FOR USE ON AUTOMOTIVE STEERING COLUMN SWITCH

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

The present invention relates to an electric switch, notably an automotive steering column switch, featuring a switching lever fitted in the switch casing and serving to switch at least one electric circuit while having on its exposed end a spring-loaded push button for actuation of another electric circuit.

It is generally known to actuate the switching lever of steering column switches in two planes of movement in order to be able to switch a plurality of functions in a clear manner. Additionally it is frequently customary to provide the switching lever on its exposed end with a push button adapted for actuation in axial direction, to perform additional switching functions.

Known from German Patent Publication DE-OS 30 45 159 is an automotive steering column switch featuring a switching element that pivots about a casing-fixed axis and contains, a catch of flexible arrangement which interacts with a stationary cam and a contact bridge for the turn signal circuit. Within the switching element, an actuator lever is pivotably mounted about a stud which is aligned perpendicularly to the casing-fixed axis and parallel to the pivotal plane of the switching element. The actuating lever possesses a spring-loaded catch that interacts with a cam in the switching element. On the end of the actuating lever rests the actuating arm of a rocker which by way of its crank is in working connection, via a slide, with a switching rocker for actuation of the passing light and for turn signal switching. The actuating lever performs thus two movements.

Known German Patent Publication from DE-OS 29 52 298 is a steering column switch which features a switching arrangement with which the left, or right turn signal lights can be activated for signaling the direction of travel, and a switching arrangement capable of influencing the circuit of the headlights. The former switching arrangement is actuated by horizontal pivoting, the second by vertical pivoting of an actuating lever. To be able to perform this movement, the actuating lever is mounted in a switching element so as to rotate about a horizontal axis, which switching element is rotatable about a vertical axis by way of two studs that extend into two casing holes.

Known German Patent Publication from DE-PS 33 43 661 a steering column switch that features two electrically interconnected printed circuit boards, of which one is laminated on both sides and with which printed circuit boards the movements of the actuating lever of the switch in horizontal and vertical direction, or plane, enables a plurality of switching functions, such as parking lights, headlights, low beam, passing lights, turn signal right and left.

SUMMARY OF THE INVENTION

The objective underlying the invention is to provide a switch of the initially mentioned type with a horizontal and/or vertical direction of switching of the switching lever and with a push button arranged on the end of the switching lever and which is compact in construction volume.

This objective is inventionally achieved in that the push button is in working connection, via a spring-loaded connecting rod, with a cross lever that is located in the axis of rotation of the switching lever and mounted pivotably while connected on its pivotable end to a spring-loaded switching member which acts upon contacts.

The present invention provides a compact design of the switch and a reliable transmission of force from the push button to the switching member. The arrangement of the pivotable cross lever in the axis of rotation of the switching lever enables the switching function of the push button to be initiated in any position of the switching lever; and, the cross lever requires virtually no extra installation space.

In one embodiment of the invention, the push button features an inner sleeve that is arranged movably and rotationally fixed on the stem of the switching lever and forms with its outer sheathing the switching lever handle thereby in get rating the push button in the switching lever.

Spring spring-loading of the push button is accomplished by the present invention in its inner sleeve a centered stud which bears against the pressure of a compression spring arranged in the stem of the switching lever.

To assure a reliable pivoting of the cross lever, the ends of the cross lever situated in the vertical axis of rotation of the switching lever are according to a further embodiment of the invention, formed of a ball-shaped design and mounted, each, in a matching socket in the upper casing half and a corresponding socket in the switching member. The exposed end of the connecting rod is suitably in contact with the center area of the cross lever.

In order to achieve a simple spring-loading of the connecting rod, the axially offset connecting rod is according to a further development of the invention arranged in axial proximity in the switching lever and has a projection thereon which bears on a spring fitted in the switching lever.

To enable a locking and release of the switching function initiated by the spring-loaded push button, the switching member coordinated with the push button connects to catching means which fix its switching position. These means are preferably comprise a heart cam and a pawl featuring an elastically movable decent joined to said cam. The switching element is suitably accommodated here in the lower casing half, and is horizontally movable against the force of a spring. Furthermore, the switching element connects preferably, by way of a spring-loaded contact roll, to the contact carrier insert.

The invention will be more fully explained hereafter with the aid of an exemplary embodiment illustrated in the drawings.

BRIEF DESCRIPTION OF THE DRAWINGS

FIG. 3, a section through the illustration according to FIG. 1, along line III—III, scaled up;

FIG. 4, a section through the illustration relative to FIG. 3, along line IV—IV;

FIG. 5, a section through the illustration according to FIG. 3, along line V—V;

FIG. 6, scaled up, an illustration of detail VI in FIG. 1; and

FIG. 7, a section through the illustration according to FIG. 6, along line VII—VII.

DETAILED DESCRIPTION OF THE INVENTION

Figure 1:
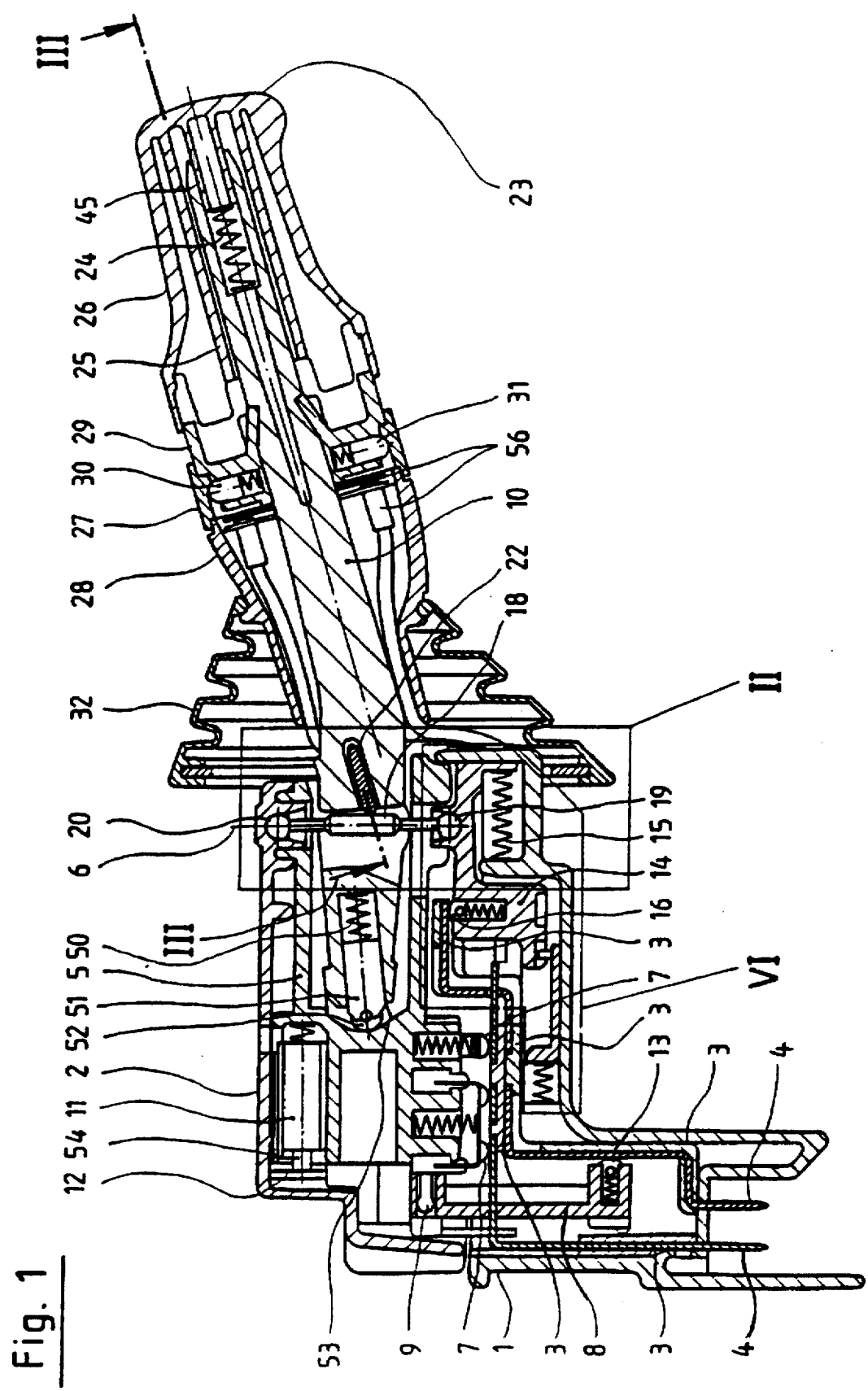
FIG. 1, a longitudinal section through a steering column switch.

The switch casing of the steering column switch is composed of a lower casing half 1 and an upper casing half 2 which are joined with the aid of clips. The lower casing half 1 accommodates a contact carrier insert 3 that has a plurality of angles or bend formed therein and whose contact tracks extend into outward contacts 4. Associated with the horizontal top side of the contact carrier insert 3 is a switching element 5 which pivots horizontally about an axis of rotation 6, and which is connected to a switching lever 10 and serves to act upon a windshield wiper, spring-loaded contact bridges 7 are fitted in the switching member 5 and perform a switching function on stationary contacts. Associated with the downward-angled, vertical part of the contact [sic] insert 3 is a switching member 8 for single-action switching of the windshield/rear window wipers, said switching element being vertically movable in guide-ways provided in the casing. Serving that purpose is an extended ridge 9 of the vertically pivotable switching lever 10, which latter is mounted, spring-loaded, in the switching member 5. The ridge 9 engages a matching recess in the switching member 8.

Arranged in the switching member 8 are a plurality of spring-loaded contact rolls 13 for acting upon the appropriate contact tracks of the contact carrier insert 3. The end of the switching lever 10 situated inside the switching member 5 accommodates a catch 51 with a roll 52, spring-loaded by a compression spring 50, said roll interacting with a cam 53 molded to the switching member 5.

The switching the switching member 5 features a spring-loaded catch 11 with a roll 54 interacting with a cam 12 molded to the upper casing half 2. The mounting points for the switching member 5 and the switching lever 10 fitted in the switching member 5 intersect, so that the switching lever can be moved both horizontally and vertically. further switching member for controlling the circuit of a rear window wiper 14 is arranged in the lower casing half 1, and is associated with the contact carrier insert; said switching member 14 being movable horizontally against the force of a spring 15 and establishing by way of a spring-loaded contact roll 16 in its switching position a dependable electric connection with the appropriate contact tracks of the contact carrier insert 3.

Figure 2:
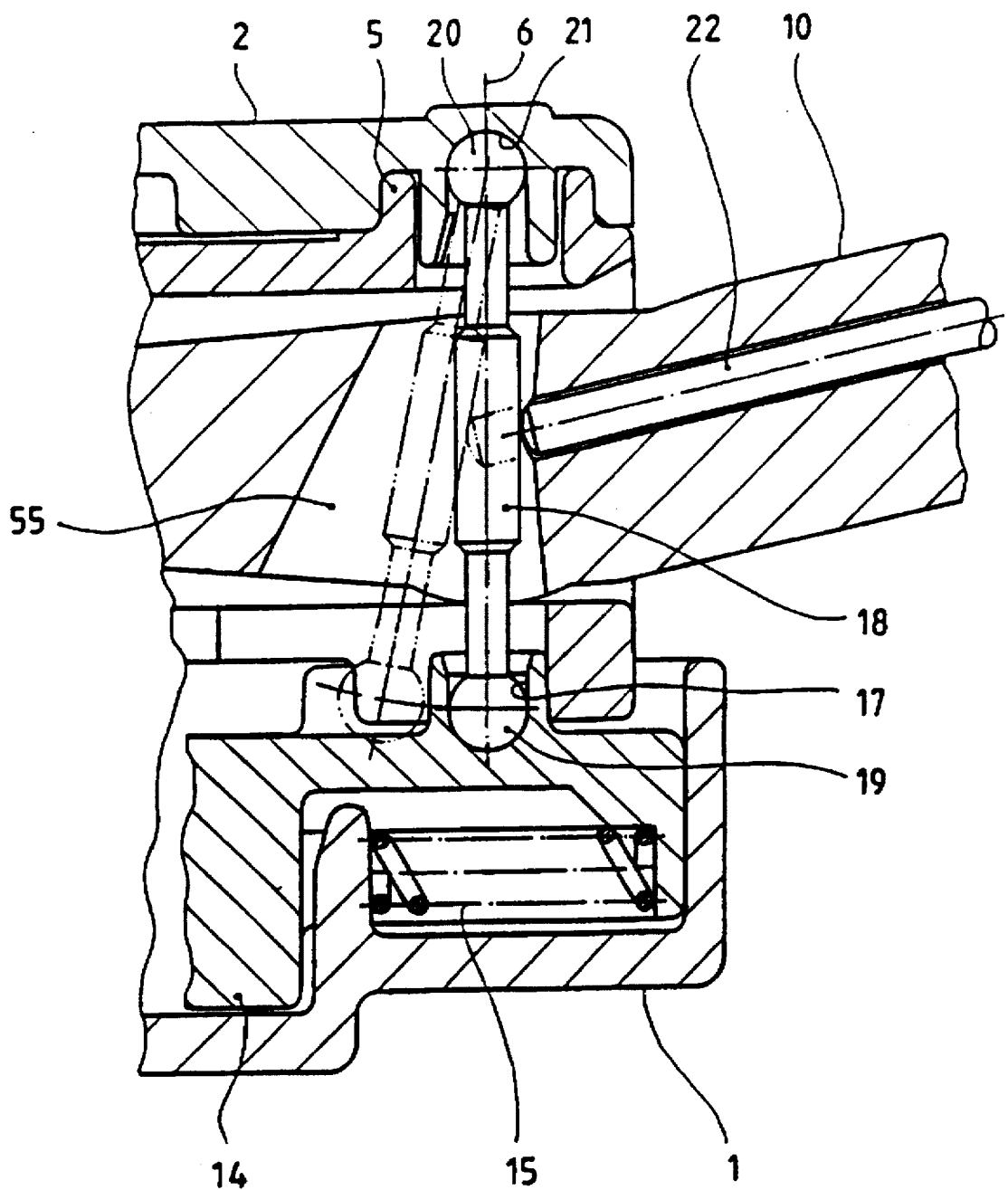
FIG. 2, scaled up, the detail II in FIG. 1.

Referring to FIG. 2, the switching member 14 is moved by way of a ball socket 17 which in engaged through an appropriate conduit 55 of the switching lever 10 by a cross lever 18 with a ball end 19. The cross lever 18 is received through a passage or conduit 55 formed in lever 10 and is fitted with its other ball end 20 in a ball socket 21 in the upper casing half 2.

A freely movable, spring-loaded connecting rod 22 is fitted lengthwise in the switching lever 10 and bears approximately in the center of the cross lever 18. Lever 10 extends with its extension to a push button 23, allowing movement by that push button against the effect of a spring 24. The push button 23 is with an inner sleeve 25 and is fitted on the switching lever 10 so as to be easily movable and has an outer sheathing a forming switch handle 26. The push button 23 can be actuated in any position of the switching lever 10, thereby initiating its function.

Referring to FIG. 1, the switching ring 27 serves to adjust different speed stages of the windshield wiper. The switching ring 27 is rotatably fitted around the switching lever 10 between two sleeves 28, 29 (see FIG. 1) fitted as well around the switching lever 10, which sleves 28, 29 are stationary with respect to lever 10. The switching ring 27 can be set stepwise, through the intermediary of spring-loaded catches 30, 31, to the desired speed of the windshield wiper; the switching ring interacts with appropriate stationary contact means 56 mounted on lever 10.

To avoid contaminations by dust and the like at the contact points on the contact carrier insert 3, the open end of the joined casing halves 1 and 2—through which extends the switching lever 10—and the grip sleeve 28 surrounding the switching lever 10 are positively enclosed by a joint flexible bellows 32.

Referring to FIG. 2, of the moment of the cross lever 18 in the switching lever 10 is between the portion shown in solid outline and the position shown in dashed line. The upper ball end 20 of the cross lever 18 is fitted in rotatable contact in the socket 21 of the upper casing half 1. The ball end 19 of the cross lever 18 moves upon displacement of the connecting rod 22, by actuation of the push button 23, to the position indicated by dash-dot line, thereby pushing the switching member 14 via the socket 17 against the pressure of spring 15 to the desired switching position.

Referring to FIG. 6 as the switching member 14 moves to the switching position, the spring-loaded contact roll 16 fitted in the switching member 14 is moved to the area of the pertaining contact tracks of the contact carrier insert 3. Catch means 34 through 38 are provided in the lower area of the switching member 14 which fix the switching member 14 in the switching position. Referring to FIG. 7 catch means 34 through 38 are comprised essentially of a pawl 34 arranged on the lower casing half 1 and featuring a detent 35, of a spring 36 which retains the pawl 34 under spring action on stops 37 in the lower casing half 1, of a heart cam 38, which is contained in the lower area of the switching member 14, and engages the detent 35.

In operating, pressing the push button 23 once causes the switching member 14 to be locked in its switching position, while pressing push button 23 again releases the switching member 14 via the heart cam 38 and allows it to be pushed back to its home position by the spring 15.

Referring to FIG. 3, the positioning of the connecting rod 22 in the switching lever 10 is shown in greater detail. The connecting rod 22 is comprised of a flat section 40 fitted asymmetrically in a guideway 41 in the switching lever 10, of a projection 42 and an extension 43 which in axial proximity bears on the end 44 of inner sleeve 25 of push button 23. A spring 39 has one reaction against member 10 and the opposite reaction end registered on the projection 42 and causes the return of the connecting rod 22 to its home position and a permanent working connection with the push button 23. This thrust motion is limited by the push button 23, which by means of clips 48 is held and secured to the switching lever 10. Referring to FIG. 1, the push button 23 features in the inner sleeve 25 a centered pin 45 which bears axially on the compression spring 24 fitted in the switching lever 10, thereby holding the push button 23 in its home position on the stop of clip 48 (FIG. 3). FIG. 4 illustrates a cross section through the switching lever 10 which has a rectangular cross-section and connecting rod 22 along line IV—IV in FIG. 3. The switching lever 10 has a rectangular cross section the inner sleeve the inner sleeve 25 of push button 23, also has a rectangular cross section and offers a good guidance and nonrotational fixing.

The connecting rod, the connecting rod 22 is non-rotating arranged between the core of the switching lever 10 and the sleeve 28 molded to it. A centered blind hole 47 is provided axially in the core of the switching lever 10, serving to accommodate the compression spring 24 for resetting the push button 23.

FIG. 5 shows a cross section through the switching lever 10 and push button 23 along line V—V in FIG. 3. The inner sleeve 25 of push button 23 is fitted movably around the cross section of switching lever 10. A compression compression spring 24 is fitted in the blind hole 47. Matching bevels 49 on the switching lever 10 and sleeve 25 facilitate the proper orientation during installation of the connecting rod 22.

The invention has been described and illustrated above with the aid of selected features.

The invention is not limited to this illustration. Instead, all of the features can be used alone or in any combination, also independently of their combination in the claims.

I claim:

1. An automotive steering column switch, featuring a casing and a switching lever fitted in the switch casing and rotatable about an axis and serving to switch at least one electric circuit, wherein the switching lever supports on an exposed end thereof a spring-loaded push button for acting upon a further electric circuit, characterized in that the push button (23) acts upon a spring-loaded connecting rod (22) which is in working connection with a pivotable cross lever (18) situated in the axis of rotation (6) of the switching lever (10) said cross lever connected to a spring-loaded switching member (14) acting upon contacts (4).

2. Electric switch according to claim 1, characterized in that the push button (23) features an inner sleeve (25) which is arranged movably and nonrotatably on the switching lever (10) and an outer sheathing which forms the switch handle (26).

3. Electric switch according to claim 2, characterized in that the push button (23) features in the inner sleeve (25) a centered pin (45) which bears against the compression spring (25) arranged in a stem of the switching lever (10).

4. Electric switch according to one of the claim 1, characterized in that ends (19, 20) of the cross lever (18) situated in a vertical axis of rotation (6) of the switching lever (10) are ball-shaped and fitted each in an appropriate socket (21) in an upper casing half (2) of the casing and in an appropriate socket in the switching member (14).

5. Electric switch according to one of the claim 1, characterized in that an exposed end of the connecting rod (22) bears on a center area of the cross lever (18).

6. Electric switch according to one of the claim 1 characterized in that the connecting rod (22) is arranged in the switching lever (10) in axial proximity and features a projection (42) that bears on a spring (39) fitted in the switching lever (10).

7. Electric switch according to one of the claim 1, characterized in that the switching member (14) is connected to catch means (34, 38) which fix a switching position.

8. Electric switch according to one of the claim 7, characterized in that the catch means (34 through 38) is comprised essentially of a heart cam (38) and a pawl (34) with a detent (35) which is elastically movable and connected to said heart cam.

9. Electric switch according to one of the claim 1, characterized in that the switching member (14) is accommodated in a lower casing half (10) of the casing allowing horizontal movement against a force of a spring (15).

10. Electric switch according to one of the claim 1, characterized in that the switching member (14) connects by way of a spring-loaded contact roll (16) to a contact carrier insert (3).

* * * * *